United States Patent Office

3,634,510
Patented Jan. 11, 1972

3,634,510
PREPARATION OF N-ALKYLCARBOXAMIDES
Louis Schmerling, Riverside, Ill., assignor to Universal Oil Products Company, Des Plaines, Ill.
No Drawing. Filed Aug. 28, 1969, Ser. No. 853,963
Int. Cl. C07c *103/00*
U.S. Cl. 260—561 R      10 Claims

ABSTRACT OF THE DISCLOSURE

Carboxamides, and particularly carboxamides containing alkyl substituents on the nitrogen atom, are prepared by condensing a nitrile with an alkyl halide in the presence of certain metal halides and water. In this way, N-t-butylacetamide is prepared from acetonitrile and t-butyl chloride.

---

This invention relates to a method for preparing carboxamides, and particularly to a method for preparing carboxamides which contain alkyl substituents on the nitrogen atom.

The compounds which are prepared according to the process of the present invention and which comprise N-alkylcarboxamides, the term "alkyl" as used in the present specification and appended claims being defined as including both straight or branched chain alkyl as well as cycloalkyl substituents, will find use in the chemical industry as reactants, solvents or peroxide stabilizers; in organic syntheses; as general solvents; lacquers; explosives; soldering fluxes; hygroscopic agents; wetting agents; penetrating agents; etc. The compounds are prepared, as hereinbefore set forth, by condensing or reacting a nitrile with an alkyl halide in the presence of certain catalytic compositions hereinafter set forth in greater detail and water at elevated temperatures.

It is therefore an object of this invention to provide a process for preparing carboxamides.

A further object of this invention is to provide a process for preparing carboxamides containing alkyl or cycloalkyl substituents on the nitrogen atom by condensing a nitrile with an alkyl halide in the presence of certain catalytic compositions of matter.

In one aspect an embodiment of this invention resides in a process for the preparation of an N-alkylcarboxamide which comprises reacting a nitrile with an alkyl halide in the presence of a metal halide and water at condensation conditions, and recovering the resultant N-alkylcarboxamide.

A specific embodiment of this invention is found in the process for the preparation of an N-alkylcarboxamide which comprises reacting acetonitrile with t-butyl chloride in the presence of cuprous chloride and water at a temperature in the range of from 50 to about 250° C. and a pressure in the range of from atmospheric to about 100 atmospheres, and recovering the resultant N-t-butylacetamide.

Other objects and embodiments will be found in the following further detailed description of the present invention.

As hereinbefore set forth the present invention is concerned with a process for preparing substituted carboxamides in which the substituent is positioned on the nitrogen atom. Specifically speaking, the invention concerns a one-step N-alkylation process as opposed to the prior art in which the N-alkylation of a nitrile has heretofore been accomplished in separate and distinct steps. The process is effected by reacting or condensing a nitrile with an algyl halide, the term "alkyl" being hereinafter defined, said process being effected in the presence of water and certain halide salts of metals. For purposes of this invention the term "nitrile" as used in the specification and append claims will connote both saturated and unsaturated nitriles. The nitriles which are utilized as one of the starting materials of the present process will comprise those nitriles containing from 2 to 20 carbon atoms or more and will include alkyl nitriles such as acetonitrile, propionitrile, butyronitrile, valeronitrile, hexanenitrile, heptanenitrile, octanenitrile, nonanenitrile, decanenitrile, undecanenitrile, dodecanenitrile, tridecanenitrile, tetradecanenitrile, pentadecanenitrile, hexadecanenitrile, heptadecanenitrile, octadecane nitrile, nonadecanenitrile, eicosanenitrile, etc.; aromatic nitriles such as benzonitrile, phenylacetonitrile, phenylpropionitrile, etc.; unsaturated nitriles such as acrylonitriles, crotononitrile, oleonitrile, etc. It is to be understood that the aforementioned nitriles are only representative of the class of compounds which may be used, and that the present invention is not necessarily limited thereto.

The aforementioned nitriles are reacted or condensed with an alkyl halide and preferably a chloride, it also being contemplated that other halides such as bromides, iodides and fluorides may be used although not necessarily with equivalent results. Representative examples of these alkyl halides which may be used include the open chain alkyl halides containing from 1 to about 20 carbon atoms or more including methyl chloride, ethyl chloride, n-propyl chloride, isopropyl chloride, n-butyl chloride, sec-butyl chloride, t-butyl chloride, n-pentyl chloride, sec-pentyl chloride, isopentyl chloride, n-hexyl chloride, 2-methylpentyl chloride, 3-methylpentyl chloride, n-heptyl chloride, 2-methylhexyl chloride, 3-methylhexyl chloride, n-octyl chloride, 2-methylheptyl chloride, 3-methylheptyl chloride, 4-methylheptyl chloride, the corresponding isomeric nonyl-, decyl-, undecyl-, dodecyl-, tridecyl-, tetradecyl-, pentadecyl-, hexadecyl-, heptadecyl-, octadecyl-, nonadecyl-, eicosyl chlorides; cycloalkyl halides such as cyclopentyl chloride, cyclohexyl chloride, cycloheptyl chloride, 1-, 2-, or 3-methylcyclopentyl chloride, 1-, 2-, 3-, or 4-methylcyclohexyl chloride, etc.; the corresponding bromide, iodides and fluorides. Of the aforementioned alkyl chlorides, the preferred compounds will comprise those alkyl chlorides containing a tertiary carbon atom such as t-butyl chloride, etc., inasmuch as the tertiary alkyl chlorides are more reactive than the secondary alkyl chlorides such as sec-pentyl chloride, said secondary alkyl chlorides, in turn, being more reactive than the primary alkyl chlorides such as methyl chloride or ethylene chloride.

The reaction or condensation of the nitrile and the alkyl halide is effected at elevated temperatures ranging from about 50° to about 250° C. or more and preferably in a range of from about 100° to about 150° C. In addition, the reaction may also be effected at a pressure ranging from atmospheric up to about 100 atmospheres or more, said pressure being due to pressure of the reactants or being effected by the introduction of an inert gas such as nitrogen into the reaction zone. In the preferred embodiment of this invention sufficient pressure is utilized to maintain the reactants in the liquid phase. It is also contemplated within the scope of this invention that substantially inert organic solvents may be employed such as by a straight-chain paraffin such as n-heptane, hexane, cycloparaffins such as cyclopentane, cyclohexane, methylcyclohexane, etc.; lower molecular weight alcohols such as methyl alcohol, ethyl alcohol, n-propyl alcohol, isopropyl alcohol, etc.; aromatic hydrocarbons such as benzene, toluene, the xylenes, etc. The reaction is also effected in the presence of certain halide salts of metals, a criterion being that the oxide of the metals constitute weak bases. Since the reactions are carried out in the presence of water, these catalysts include salts which are not catalysts for Friedel-Crafts reactions. Representative examples of these catalysts which may be used include anhydrous and hydrated forms of the salts such as cuprous chloride, cupric chloride, ferrous chloride, ferric chloride, ferrous chloride tetrahydrate, ferric chloride hexahydrate, aluminum chloride hexahydrate, zinc chloride, etc. In addition, the reaction is also effected in the presence of water, said water being present in the reaction mixture in an amount ranging from about 2% to about 50% or more by weight of the nitrile.

The process of this invention may be effected in any suitable manner. It may comprise either a batch or continuous type operation. For example, when a batch type operation is used a quantity of the starting materials comprising the nitrile, the alkyl halide along with the metal halide and water are placed in an appropriate apparatus along with, if so desired, a solvent of the type hereinbefore set forth. A specific type of apparatus which may be used in this type of alkylation, especially when the one-step N-alkylation is to be effected comprises a rotating or mixing autoclave. The autoclave is sealed and an inert gas such as nitrogen pressed in until the initial desired pressure has been reached. The autoclave is then heated to the reaction temperature and maintained thereat for the desired residence time which may range from 0.5 up to about 10 hours or more in duration. Upon completion of the reaction time heating is discontinued and the apparatus and contents thereof allowed to return to room temperature. The excess pressure, if any, is discharged and the reaction mixture is recovered. The mixture is then separated from the catalyst by conventional means such as filtration, distillation, etc. and thereafter subjected to conventional purification and separation means which may include washing, extraction, drying, fractional distillation under reduced pressure, fractional crystallization, etc. whereby the desired product comprising the N-alkylcarboxamide is separated and recovered.

It is also contemplated within the scope of this invention that the process described herein may be effected in a continuous manner of operation. When such a type of operation is used the nitrile and the alkyl halide are continuously charged to a reaction vessel which is maintained at the proper operating conditions of temperature and pressure which also contains the particular catalyst or mixture of metal halide catalysts which has been selected. The water and the solvent, if one is to be utilized, are also continuously charged to the reactor. Alternatively speaking, the reactants may be admixed prior to entry into said reactor and charged thereto in a single stream or the water and solvent may be admixed with one or both of the reactants prior to entry into said reaction zone. After completion of the predetermined residence time has been effected the reactor effluent is continuously withdrawn and subjected to separation steps whereby any unreacted starting materials, water, and solvent are removed from the desired product comprising the N-alkylcarboxamides, said unreacted starting materials, water and solvent being recycled to the reaction zone while the desired product is recovered for storage. A particularly applicable type of operation which may be used in this process comprises a fixed bed operation in which the catalyst which is substantially water-insoluble is disposed as a fixed bed in the reaction zone while the reactants pass through said zone in either an upward or downward flow. The second type of operation which may be employed comprises a moving bed type of operation in which the catalyst and the reactants pass through the reaction zone either concurrently or countercurrently to each other or the slurry type of operation in which the catalyst is carried into the reaction zone as a slurry in one or both of the reactants. It is to be noted that in each of these types of reactions, the method of recovering the desired product is essentially the same as that hereinbefore described. When water-soluble catalysts are used, an aqueous solution of the catalysts is fed over a fixed bed of an inert substance such as alumina or silica pills while the other reactants are simultaneously fed from another line.

Some specific examples of N-alkylcarboxamides which may be prepared according to the process of this invention will include N-isopropylacetamide, N-isopropylbutyramide, N-isopropylpropionamide, N-isopropylvaleramide, N-isopropylhexanamide, N-isopropylbenzamide, N-isopropylphenylacetamide, N-t-butylacetamide, N-t-butylbutyramide, N-t-butylpropionamide, N-t-butylvaleramide, N-t-butylhexanamide, I-t-butylbenzamide, N-t-butylphenylbutylhexanamide, N-t-butybenzamide, N-t-butylphenylacetamide, N-sec-amylacetamide, N-sec-amylbutyramide, N-sec-amylpropionamide, N-sec-amylvaleramide, N-sec-amylhexanamide, N-sec-amylbenzamide, N-sec-amylphenylacetamide, N-isopropylacrylamide, N-t-butylacrylamide, N-sec-amylacrylamide, N-isopropylcrotonamide, N-t-butylcrotonamide, N-sec-amylcrotonamide, N-isopropyloleamide, N-t-butyloleamide, N-sec-amyloleamide, etc. It is to be understood that the aforementioned compounds are only representative of the class of compounds which may be prepared when utilizing the process of the present invention, and that the said invention is not necessarily limited thereto.

The following examples are given to illustrate the process of the present invention which, however, are not intended to limit the generally broad scope of the present invention in strict accordance therewith.

EXAMPLE I

In this example 82 g. (2.0 mole) of acetonitrile, 71 g. (0.77) mole of t-butyl chloride along with 0.28 mole of water and 6 g. of a catalyst comprising equal weights of cuprous chloride and ferric chloride hexahydrate were placed in the glass liner of a rotating autoclave. The liner was sealed into the autoclave and nitrogen pressed in until an initial pressure of 30 atmospheres was reached. The autoclave was then heated to a temperature of 120° C. and maintained thereat for a period of four hours. At the end of this time heating was discontinued and the autoclave allowed to return to room temperature. The excess pressure was discharged and the reaction mixture was recovered. After separation from the catalyst, analysis of the product by means of a gas-liquid chromatography, infrared and nuclear magnetic resonance disclosed the presence of 0.20 moles (26% based on the t-butyl chloride charged) of N-t-butylacetamide.

EXAMPLE II

A mixture of 80 g. (0.75 mole) of sec-pentyl chloride, 82 g. (2.0 mole) of acetonitrile along with 0.25 mole of water and 6 g. of a catalyst comprising cuprous chloride is placed in the glass liner of a rotating autoclave. The autoclave is then sealed and nitrogen pressed in until an initial pressure of 30 atmospheres is reached. Following this, the autoclave is heated to a temperature of 125° C. and maintained thereat for a period of 8 hours. At the end of this time heating is discontinued and the autoclave allowed to return to room temperature. After discharging the excess pressure, the autoclave is opened and the reaction mixture is recovered therefrom. After separation from the catalyst, the desired product comprising N-sec-pentylacetamide is recovered.

EXAMPLE III

A mixture consisting of 71 g. (0.77 mole) of t-butyl chloride, 110 g. (2.0 mole) of propionitrile, 0.3 g. mole of water and 6 g. of a catalyst comprising cuprous chloride is placed in the glass liner of a rotating autoclave. After sealing the liner into the autoclave, nitrogen is pressed in until an initial pressure of 30 atmospheres is reached. The autoclave is then heated to a temperature of 125° C. and maintained thereat for a period of 8 hours. At the end of this time heating is discontinued, the autoclave is allowed to return to room temperature and the excess pressure is discharged. Following this, the autoclave is opened and the reaction mixture is recovered therefrom. The mixture is separated from the catalyst and the desired product comprising N-t-butylpropionamide is recovered.

EXAMPLE IV

In this example 60 g. (0.75 mole) of isopropyl chloride, 110 g. (2.0 mole) of propionitrile, 0.3 mole of water and 6 g. of a catalyst consisting of equal weights of cuprous chloride and ferric chloride hexahydrate are placed in the glass liner of a rotating autoclave and treated in a manner similar to that set forth in the above examples. After allowing the reaction to proceed under an implied pressure of 30 atmospheres of nitrogen at a temperature of 125° C. for a period of 8 hours, the reaction mixture is recovered. The desired product comprising N-isopropylpropionamide is recovered from the mixture.

EXAMPLE V

A mixture consisting of 88.9 g. (0.75 mole) of cyclohexyl chloride, 82 g. (2.0 mole) of acetonitrile, 0.3 mole of water and 6 g. of a catalyst consisting of a mixture of equal weights of cuprous chloride and ferric chloride hexahydrate is charged to the glass liner of a rotating autoclave which is thereafter sealed into said autoclave. After pressuring the autoclave to 30 atmospheres with nitrogen, heat is applied until a temperature of 120° C. is reached. The reaction is allowed to proceed for a period of 8 hours while maintaining the autoclave at this temperature, following which the heating is discontinued, and after allowing the autoclave to return to room temperature, the excess pressure is discharged. After recovering the mixture from the autoclave and separating the catalyst therefrom, the desired product comprising N-cyclohexylacetamide is recovered.

I claim as my invention:

1. A process for the preparation of an N-alkylcarboxamide which comprises reacting an alkylnitrile in which the alkyl contains from 1 to 20 carbon atoms, with an alkyl halide in the presence of water and a chloride of a metal, the oxide of which constitutes a weak base, at a temperature of about 50° to 250° C. and a pressure of about 1 to 100 atmospheres, and recovering the resultant N-alkylcarboxamide.

2. The process as set forth in claim 1 in which said alkyl halide is a sec-alkyl or t-alkyl or cycloalkyl chloride.

3. The process as set forth in claim 1 in which said metal chloride is cuprous chloride.

4. The process as set forth in claim 1 in which said metal chloride is cupric chloride.

5. The process as set forth in claim 1 in which said metal chloride is ferric chloride.

6. The process as set forth in claim 1 in which said nitrile is acetonitrile, said alkyl halide is t-butyl chloride and said alkylcarboxamide is N-t-butylacetamide.

7. The process as set forth in claim 1 in which said nitrile is acetonitrile, said alkyl halide is sec-amyl chloride and said alkylcarboxamide is N-sec-pentylacetamide.

8. The process as set forth in claim 1 in which said nitrile is propionitrile, said alkyl halide is t-butyl chloride and said alkylcarboxamide is N-t-butylpropionamide.

9. The process as set forth in claim 1 in which said nitrile is propionitrile, said alkyl halide is isopropyl chloride and said alkylcarboxamide is N-isopropylpropionamide.

10. The process as set forth in claim 1 in which said nitrile is acetonitrile, said alkyl halide is cyclohexyl chloride and said alkylcarboxamide is N-cyclohexylacetamide.

References Cited
UNITED STATES PATENTS 2,628,217    2/1953    Magat _____ 260—78

LEWIS GOTTS, Primary Examiner

E. G. LOVE, Assistant Examiner

U.S. Cl. X.R.

260—404, 558 R